United States Patent
Wu et al.

(10) Patent No.: US 12,536,610 B1
(45) Date of Patent: Jan. 27, 2026

(54) REMOTE-SENSING-BASED TEMPORAL NET EXCHANGE ESTIMATION METHOD AND REMOTE-SENSING-BASED TEMPORAL NET EXCHANGE ESTIMATION SYSTEM OF FARMLAND ECOLOGICAL SYSTEM

(71) Applicant: WUHAN UNIVERSITY, Hubei (CN)

(72) Inventors: Zhaocong Wu, Hubei (CN); Kexin Wang, Hubei (CN); Ruixin Fang, Hubei (CN); Nan Xie, Hubei (CN); Keyi Rao, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 19/267,613

(22) Filed: Jul. 13, 2025

(30) Foreign Application Priority Data

Jul. 26, 2024 (CN) .......................... 202411012698.9

(51) Int. Cl.
    *G06V 20/00*      (2022.01)
    *G06T 3/40*      (2006.01)

(52) U.S. Cl.
    CPC ..................................... *G06T 3/40* (2013.01)

(58) Field of Classification Search
    CPC ...... G06Q 50/02; G06V 20/188; G06V 20/13; G06N 20/00
    See application file for complete search history.

(56) References Cited

U.S. PATENT DOCUMENTS

| | | | |
|---|---|---|---|
| 2022/0061236 A1* | 3/2022 | Guan | A01G 7/00 |
| 2024/0241287 A1* | 7/2024 | Luo | G01W 1/10 |

(Continued)

FOREIGN PATENT DOCUMENTS

| | | |
|---|---|---|
| CN | 101551459 | 10/2009 |
| CN | 109766871 | 5/2019 |

(Continued)

OTHER PUBLICATIONS

Veroustraete, F., J. Patyn, and R. B. Myneni. "Estimating net ecosystem exchange of carbon using the normalized difference vegetation index and an ecosystem model." Remote Sensing of Environment 58.1 (1996): 115-130.*

(Continued)

*Primary Examiner* — Li Liu
(74) *Attorney, Agent, or Firm* — JCIP GLOBAL INC.

(57) ABSTRACT

A remote-sensing-based temporal net exchange estimation method of a farmland ecological system is provided. The remote-sensing-based temporal net exchange estimation method includes: obtaining low-resolution LAI remote-sensing images and high-resolution NDVI remote-sensing images during the transit of same day in a growth period of crops and constructing, associating and generating multi-temporal LAI data; in combination with daily temperature and surface solar radiation data, obtaining an LAI temporal result by simulation; comparing model simulation with remote-sensing data result and performing parameter sensitivity analysis and model uncertainty analysis to determine localized model parameters; inputting these localized parameters into the model, assimilating the high-resolution LAI result and outputting a spatial distribution temporal result of the net exchange of the farmland ecological system.

8 Claims, 4 Drawing Sheets

(56) References Cited

U.S. PATENT DOCUMENTS

2024/0320689 A1* 9/2024 Mohite ................ G06V 20/188
2024/0420254 A1* 12/2024 Sadeh ................ G06V 20/188

FOREIGN PATENT DOCUMENTS

| CN | 110276304 | 9/2019 |
| CN | 116071644 | 5/2023 |
| CN | 116863348 | 10/2023 |
| WO | 2023131949 | 7/2023 |
| WO | 2024113427 | 6/2024 |

OTHER PUBLICATIONS

Gottschalk, Pia, et al. "Monitoring cropland daily carbon dioxide exchange at field scales with Sentinel-2 satellite imagery." Biogeosciences 21.16 (2024): 3593-3616.*

Yuval Sadeh et al., "Fusion of Sentinel-2 and PlanetScope time-series data into daily 3 m surface reflectance and wheat LAI monitoring", International Journal of Applied Earth Observations and Geoinformation, Nov. 16, 2020, pp. 1-14, vol. 96.

Mou; Subin, "Estimation of Ecosystem Net Carbon Exchange Based on Remote Sensing and Flux Observation Data", Modern Information Technology, Aug. 2020, with English translation thereof, pp. 21-23, vol. 4, No. 15.

"Office Action of China Counterpart Application", issued on Sep. 4, 2024, with English translation thereof, p. 1- p. 17.

"Search Report of China Counterpart Application", issued on Sep. 29, 2024, with English translation thereof, p. 1- p. 4.

* cited by examiner

REMOTE-SENSING-BASED TEMPORAL NET EXCHANGE ESTIMATION METHOD AND REMOTE-SENSING-BASED TEMPORAL NET EXCHANGE ESTIMATION SYSTEM OF FARMLAND ECOLOGICAL SYSTEM

CROSS-REFERENCE TO RELATED APPLICATION

This application claims the priority benefit of China application no. 202411012698.9, filed on Jul. 26, 2024. The entirety of the above-mentioned patent application is hereby incorporated by reference herein and made a part of this specification.

TECHNICAL FIELD

The present disclosure relates to the field of net exchange estimation technologies of ecological systems and in particular to a remote-sensing-based temporal net exchange estimation method and a remote-sensing-based temporal net exchange estimation system of a farmland ecological system.

DESCRIPTION OF RELATED ART

The global and regional carbon cycle is one of core research topics in the global change research and macro ecology. The feedback of the carbon cycle will significantly affect the future climate change. For the carbon cycle research, its core problem is to precisely evaluate the size of the carbon source/sink and study its distribution and change. The net carbon dioxide exchange of the ecological systems is the direct characterization of the carbon source or carbon sink.

The crops have obvious differences in the carbon emission of the whole growth period in different phenological periods. In the whole growth period, the crops have different characteristics of carbon source and carbon sink in different stages from sowing, sprouting, growth, ripening and harvest. Knowing and monitoring the performance and distribution of the carbon source and carbon sink of the crops in the whole growth period have great significance in guiding farmland carbon emission control.

The existing remote-sensing-based net exchange of the farmland ecological system mostly employs the low-resolution remote-sensing images and often fails to acquire the spatial distribution result of the carbon emission of the crops in the whole growth period.

SUMMARY

The present disclosure provides a remote-sensing-based temporal net exchange estimation method and a remote-sensing-based temporal net exchange estimation system of a farmland ecological system to solve or at least partly solve the technical problem of insufficient details of a spatiotemporal result of net exchange of a farmland ecological system in the prior arts.

In order to solve the above technical problem, a first aspect of the present disclosure provides A remote-sensing-based temporal net exchange estimation method of a farmland ecological system, comprising the following steps:
at step S1, obtaining a low-resolution Leaf Area Index (LAI) remote-sensing image result and a high-resolution Normalized Difference Vegetation Index (NDVI) remote-sensing image result during the transit of same day in a growth period of crops;
at step S2, constructing an empirical relationship between the high-resolution NDVI remote-sensing image result and the low-resolution LAI remote-sensing image result during the transit of same day in the growth period to obtain a high-resolution image-based multi-temporal LAI result in the growth period;
at step S3, inputting daily temperature data and daily surface solar radiation data into a pre-constructed net exchange estimation model of the farmland ecological system to obtain a model-simulated LAI temporal result in the growth period of the crops;
at step S4, by using the model-simulated LAI temporal result in the growth period of the crops and the high-resolution image-based multi-temporal LAI result in the growth period, performing parameter sensitivity analysis and model uncertainty analysis on the net exchange estimation model of the farmland ecological system to obtain localized model parameters;
at step S5, substituting the localized model parameters into the net exchange model of the farmland ecological system, and in the daily simulation of LAI, assimilating the high-resolution image-based multi-temporal LAI result in the growth period into model simulation and finally, outputting a spatial distribution temporal result of the net exchange of the farmland ecological system;

In one embodiment, wherein the step S1 comprises:
determining a time range of a single crop from sowing to harvest in a study region to determine the growth period of the crops;
obtaining all transiting Sentinel-2 satellite data within the growth period of the crops to perform regional pruning and LAI calculation and then obtaining the low-resolution LAI remote-sensing image result; obtaining all transiting PlanetScope satellite data within the growth period of the crops to perform regional pruning and NDVI calculation and then obtaining the high-resolution NDVI remote-sensing image result.

In one embodiment, wherein the step S2 comprises:
performing same-day-transiting image screening on the obtained low-resolution LAI
remote-sensing image result and high-resolution NDVI remote-sensing image result to single out two image products transiting same day;
resampling the high-resolution NDVI remote-sensing image result to the resolution of the low-resolution LAI remote-sensing image result and obtaining all image pairs with dates matching in the to-be-net-exchanged region of the farmland ecological system;
based on the obtained image pairs, constructing an empirical relationship between the high-resolution NDVI remote-sensing image result and the low-resolution LAI remote-sensing image result in the to-be-net-exchanged region of the farmland ecological system to obtain the high-resolution image-based multi-temporal LAI result in the growth period.

In one embodiment, wherein the step S3 comprises:
the pre-constructed net exchange estimation model of the farmland ecological system is obtained based on a difference of net primary productivity and carbon loss caused by heterotrophic respiration, and the step S3 comprises:
inputting the daily temperature and surface solar radiation data in the growth period of the crops into the pre-constructed net exchange estimation model of the farmland ecological system, so that the model-simulated LAI temporal result in the growth period of the crops is obtained based on algorithm mechanism of the model.

In one embodiment, wherein the step S4 comprises:
performing date matching on the model-simulated LAI temporal result in the growth period of the crops and the high-resolution image-based multi-temporal LAI result in the growth period to obtain the data of two results of same day;
based on difference of the data of two results of same day, performing sensitivity analysis and parameter uncertainty analysis on the parameters of the net exchange model of the farmland ecological system to obtain the localized model parameters consistent with the characteristics of the crops in the study region, wherein the localized model parameters comprise a localized specific leaf area, a distribution coefficient, and a cumulative temperature threshold.

In one embodiment, wherein the step S5 comprises:
the localized model parameters are substituted into the net exchange model of the farmland ecological system; in the daily simulation of the model for LAI, if there is satellite data on the present day, the high-resolution image-based multi-temporal LAI result in the growth period is used for calculation; if there is no satellite data on the present day, the model-simulated LAI temporal result in the growth period of the crops is used for calculation; finally, a spatial distribution temporal result of the net exchange of the farmland ecological system is obtained.

Based on the same inventive idea, a second aspect of the present disclosure provides a remote-sensing-based temporal net exchange estimation system of a farmland ecological system, comprising:
a remote-sensing image obtaining module, configured to obtain a low-resolution Leaf Area Index (LAI) remote-sensing image result and a high-resolution Normalized Difference Vegetation Index (NDVI) remote-sensing image result during the transit of same day in a growth period of crops;
a high-resolution LAI result obtaining module, configured to construct an empirical relationship between the high-resolution NDVI remote-sensing image result and the low-resolution LAI remote-sensing image result during the transit of same day in the growth period to obtain a high-resolution image-based multi-temporal LAI result in the growth period;
a model-simulated result obtaining module, configured to input daily temperature data and daily surface solar radiation data into a pre-constructed net exchange estimation model of the farmland ecological system to obtain a model-simulated LAI temporal result in the growth period of the crops;
a localized parameter obtaining module, configured to, by using the model-simulated LAI temporal result in the growth period of the crops and the high-resolution image-based multi-temporal LAI result in the growth period, perform parameter sensitivity analysis and model uncertainty analysis on the net exchange estimation model of the farmland ecological system to obtain localized model parameters;
an outputting module, configured to substitute the localized model parameters into the net exchange model of the farmland ecological system, and in the daily simulation of LAI, assimilate the high-resolution image-based multi-temporal LAI result in the growth period into the model simulation and finally, output a spatial distribution temporal result of the net exchange of the farmland ecological system.

Based on the same inventive idea, a third aspect of the present disclosure provides a computer readable storage medium, storing computer programs thereon, wherein the programs are executed by a processor to perform any one of the above the remote-sensing-based temporal net exchange estimation methods.

Based on the same inventive idea, a fourth aspect of the present disclosure provides a computer apparatus, comprising a memory, a processor and computer programs stored on the memory and run the processor, wherein the processor executes the programs to perform any one of the above the remote-sensing-based temporal net exchange estimation methods.

Compared with the prior arts, the present disclosure has the following advantages and beneficial effects.

1. Compared with the net exchange estimation method of the farmland ecological system widely used in the prior arts, considering the scattered and broken distribution of the farmlands, the present disclosure introduces high-revolution remote-sensing data by constructing an empirical relationship between high-resolution Normalized Difference Vegetation Index (NDVI) and low-resolution Leaf Area Index (LAI), to reproduce the net exchange distribution of the plot-level ecological system of the crops in the growth period (i.e. detailed presentation of the net exchange spatial distribution of the ecological system of the crops in the growth period), displaying the carbon sequestration performance of each plot in the growth period, and helping increase the carbon sequestration capability evaluation accuracy of the small-area multi-variety planting regions.

2. Compared with the net exchange estimation method of the farmland ecological system widely used in the prior arts, the present disclosure can reflect the daily spatial distribution result of the net exchange of the ecological system in the whole growth period of the crops, show each plot as the carbon source or carbon sink and the carbon sequestration capability of the crops in each growth stage, and guide the farming activities, providing decision-making support for the implementation of the carbon neutrality target in the farmland ecological systems.

BRIEF DESCRIPTION OF THE DRAWINGS

In order to more clearly describe the technical solutions in the embodiments of the present disclosure or in the prior arts, drawings required for descriptions of the embodiments or the prior arts will be briefly introduced below. Apparently, the drawings described hereunder are merely some embodiments of the present disclosure. Those skilled in the arts can also obtain other drawings based on these drawings without carrying out creative work.

DESCRIPTION OF THE EMBODIMENTS

Through a large quantity of researches and practices, the inventor of the present disclosure found that the existing net exchange estimations of the farmland ecological system mainly use the low-resolution remote-sensing data and the existing carbon cycle model of ecological system or construct a relationship between the net exchange result of the ecological system and the remote-sensing index products to obtain a multi-temporal result or single-point temporal result of the net exchange of the farmland ecological system. These methods mainly have problems in two aspects: first, limited by the resolution of the input remote-sensing data, they cannot reflect the spatial distribution details of the net exchange results of the small-area farmland ecological systems in China; second, the single-point temporal result or multi-temporal spatial distribution result of the net exchange of the ecological system cannot reflect the spatiotemporal distribution difference of the crops in phenological period in the whole growth period under multi-variety planting environment. In China, the farmlands are widely distributed from plains to mountain lands and have various plant types, and the farmland area is small in many regions. The carbon emission of the crops in the growth period involves multiple stages, and there may be different factors affecting the carbon emission of these stages. In order to monitor the carbon emission of the whole growth period, it is required to carry out continuous and exhaustive data collection, covering the data of soil type, climatic condition, crop variety, fertilizer application, irrigation and the like. For acquisition of these data, it is usually required to use complex monitoring devices and invest abundant labor and materials. Although the remote-sensing technology has made some achievements in carbon emission monitoring and evaluation, there are still some limitations in accuracy, resolution, coverage time and spatial range. Especially in fine scale, it is a challenge to acquire the carbon emission data of high temporal resolution.

The high-resolution remote-sensing can accurately distinguish different crop types and their growth conditions and can provide finer crop space information especially in the regions with complex terrains or with various crop types, so as to support the targets of sustainable development and environmental protection. Therefore, the high-resolution remote-sensing data can be used to intensify the research on the characteristics of the farmland carbon source and carbon sink and analyze the carbon sequestration capability of the crops in different growth stages, which not only helps improve the sustainability of the agricultural production but also serves as one of key measures for coping with global climate change. Considering the planting area and planting complexity of the farmlands in China, it is required to establish a net exchange estimation method of a farmland ecological system based on high-resolution remote-sensing images to finely reflect a spatial distribution temporal result of the net exchange of the ecological system of the crops in a growth period, and provide time-continuous results for accurately analyzing the carbon sequestration capability of the farmlands.

The present disclosure has the following main idea.

The remote-sensing images of the low-resolution lead area index (LAI) and high-resolution normalized difference vegetation index (NDVI) during the transit of same day in the growth period of the crops are obtained, and the multi-temporal LAI data (the high-resolution-image-based multi-temporal LAI result within the growth period) is constructed, associated and generated. In combination with daily temperature and surface solar radiation data, the LAI temporal result is obtained by simulation. The model simulation is compared with the remote-sensing data result, and parameter sensitivity analysis and model uncertainty analysis are performed to determine model parameters adapting to local conditions. These localized parameters are input into the model to assimilate the high-resolution LAI result and output the spatial distribution temporal result of the net exchange of the farmland ecological system. By using the high-resolution remote-sensing data, the present disclosure accurately discloses the spatial distribution of the net exchange of the ecological system of the small-area and broken farming plots in the whole growth period, improving the accuracy of the evaluation for the carbon sequestration capability of the planting region of diversified crops. Furthermore, the present disclosure captures the carbon sequestration potential of the crops in different growth stages, providing fine guidance for agricultural management and contributing to the application and decision making of the farmland ecological system in the carbon neutrality target.

In order to make the objects, technical solutions and advantages of the present disclosure clearer, the technical solutions of the present disclosure will be fully and clearly described below in combination with the drawings of the present disclosure. Apparently, the embodiments described hereunder are merely some embodiments of the present disclosure rather than all embodiments. All other embodiments obtained by those skilled in the arts based on these embodiments in the present disclosure without carrying out creative work shall fall within the scope of protection of the present disclosure.

Embodiment 1

An embodiment of the present disclosure provides a remote-sensing-based temporal net exchange estimation method of a farmland ecological system, which includes the following steps:

At step S1, a low-resolution Leaf Area Index (LAI) remote-sensing image result and a high-resolution Normalized Difference Vegetation Index (NDVI) remote-sensing image result during the transit of same day in a growth period of the crops are obtained.

At step S2, an empirical relationship between the high-resolution NDVI remote-sensing image result and the low-resolution LAI remote-sensing image result during the transit of same day in the growth period is constructed to obtain a high-resolution image-based multi-temporal LAI result in the growth period.

At step S3, daily temperature data and daily surface solar radiation data are input into a pre-constructed net exchange estimation model of the farmland ecological system to obtain a model-simulated LAI temporal result in the growth period of the crops.

At step S4, by using the model-simulated LAI temporal result in the growth period of the crops and the high-resolution image-based multi-temporal LAI result in the growth period, parameter sensitivity analysis and model uncertainty analysis are performed on the net exchange estimation model of the farmland ecological system to obtain localized model parameters.

At step S5, the localized model parameters are substituted into the net exchange model of the farmland ecological system, and in the daily simulation of LAI, the high-resolution image-based multi-temporal LAI result in the growth period is assimilated into the model simulation and finally, the spatial distribution temporal result of the net exchange of the farmland ecological system is output.

Figure 1:
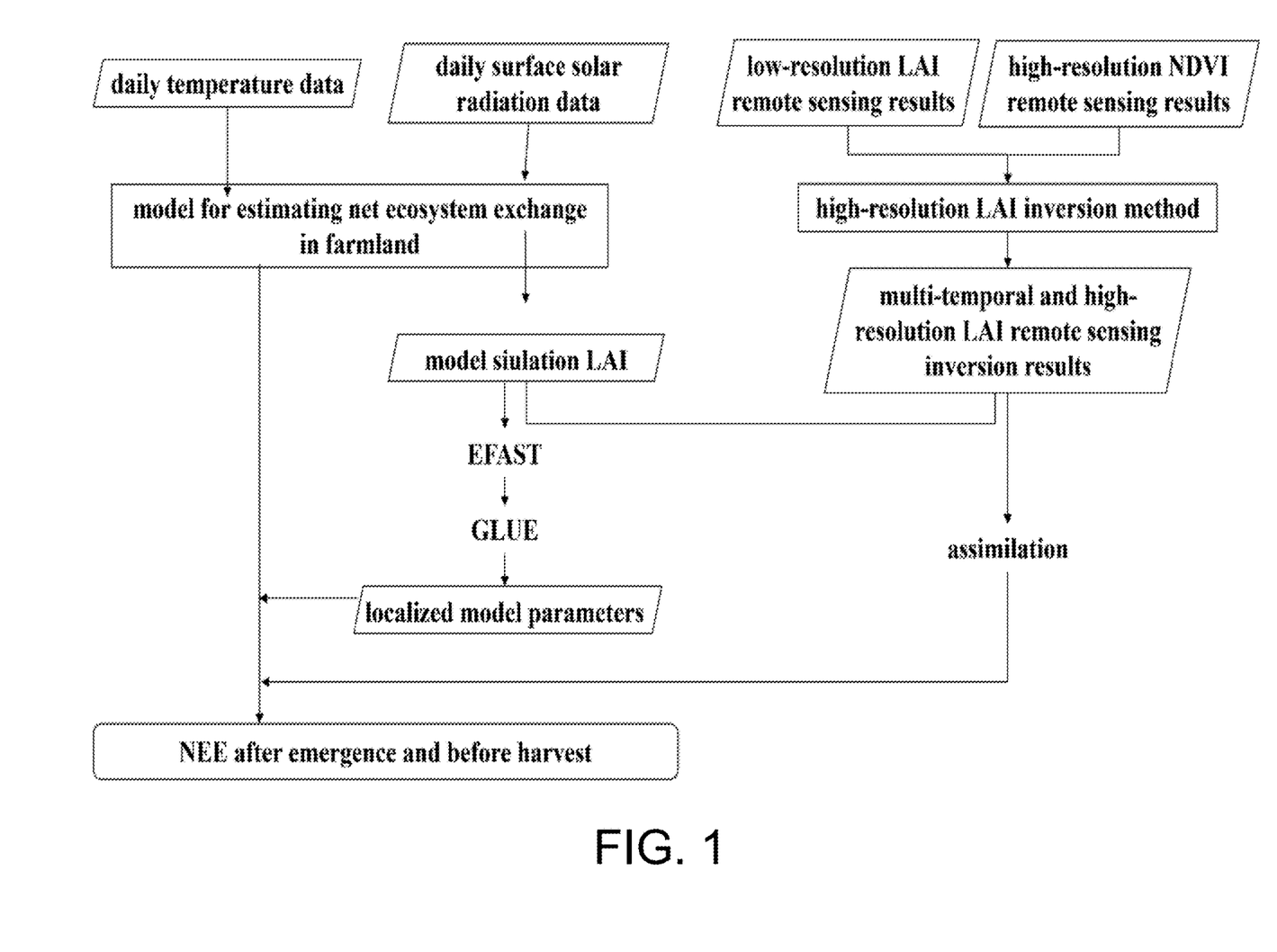
FIG. 1 is an entire flowchart illustrating a remote-sensing-based temporal net exchange estimation method of a farmland ecological system according to an embodiment of the present disclosure.

With reference to FIG. 1, it is an entire flowchart illustrating a remote-sensing-based temporal net exchange estimation method of the farmland ecological system. In FIG. 1, the LAI model-simulated temporal result is the model-simulated LAI temporal result in the growth period of the crops in the step S3, and the multi-temporal high-resolution LAI remote-sensing inversion result is the high-resolution image-based multi-temporal LAI result in the growth period in the step S2.

The empirical relationship between the two results in the step S2 is an exponential relationship constructed based on region. The pre-constructed net exchange estimation model of the farmland ecological system in the step S3 can output, with the LAI data as input, the spatial distribution temporal result of the net exchange of the farmland ecological system based on model mechanism. In the step S4, difference analysis is performed on the model-simulated LAI temporal result in the growth period of the crops and the high-resolution image-based multi-temporal LAI result in the growth period to obtain localized model parameters, which are parameters consistent with the characteristics of the crops in the study region.

The Leaf Area Index (LAI) is a ratio of a total leaf area to an observed ground area as well as an important index for describing vegetation coverage and growth conditions. The Normalized Difference Vegetation Index (NDVI) is an index obtained from satellite or aviation images by remote-sensing technology to evaluate and monitor the growth conditions and coverage of the surface vegetation. The NDVI is calculated by comparing the reflection intensities of infrared light and near infrared light based on the characteristics that plant chlorophyl absorbs infrared light and reflects near infrared light.

On the whole, in the temporal net exchange estimation method of the farmland ecological system based on high-resolution remote-sensing data in the present disclosure, by constructing a relationship between the high-resolution satellite NDVI result and the input variable (LAI) of the net exchange estimation model of the farmland ecological system, the high-resolution remote-sensing image-based LAI result is obtained and then used as an input and a calibration parameter of the model to finally obtain the spatial distribution temporal result of the net exchange of the farmland ecological system.

In one embodiment, the step S1 includes:
determining a time range of a single crop from sowing to harvest in the study region to determine the growth period of the crops;
obtaining all transiting Sentinel-2 satellite data within the growth period of the crops to perform regional pruning and LAI calculation and then obtaining the low-resolution LAI remote-sensing image result; obtaining all transiting PlanetScope satellite data within the growth period of the crops to perform regional pruning and NDVI calculation and then obtaining the high-resolution NDVI remote-sensing image result.

In the step S1, the growth period (from sowing to harvest) of the single crop in the estimation region is firstly determined. In this time range, all satellite images with the wave band sufficient to support obtaining LAI result and the satellite images with the resolution higher than the former but the wave band only sufficient to obtain NDVI data are selected.

In one embodiment, the step S2 includes:
performing same-day-transiting image screening on the obtained low-resolution LAI remote-sensing image result and high-resolution NDVI remote-sensing image result to single out two image products transiting same day;
re-sampling the high-resolution NDVI remote-sensing image result to the resolution of the low-resolution LAI remote-sensing image result and obtaining all image pairs with dates matching in the to-be-net-exchanged region of the farmland ecological system;
based on the obtained image pairs, constructing an empirical relationship between the high-resolution NDVI remote-sensing image result and the low-resolution LAI remote-sensing image result in the to-be-net-exchanged region of the farmland ecological system to obtain the high-resolution image-based multi-temporal LAI result in the growth period.

Specifically, screening is performed on the low-resolution LAI result (low-resolution LAI remote-sensing image result) and the high-resolution NDVI result (high-resolution NDVI remote-sensing image result) obtained based on remote-sensing data in the selected growth period; processing is performed on two remote-sensing data products of same day; the high-resolution NDVI result is re-sampled to be consistent with the resolution of the LAI result; all image pairs with dates matching in the LAI and NDVI images in the to-be-net-exchanged region of the farmland ecological system are obtained, and the empirical relationship in the growth period of the NDVI and LAI in this region is constructed.

In one embodiment, in the step S3, the pre-constructed net exchange estimation model of the farmland ecological system is obtained based on the difference of net primary productivity and carbon loss caused by heterotrophic respiration. The step S3 includes:
inputting the daily temperature and surface solar radiation data in the growth period of the crops into the pre-constructed net exchange estimation model of the farmland ecological system so that the model-simulated LAI temporal result in the growth period of the crops is obtained based on algorithm mechanism of the model.

Specifically, daily surface temperature, air temperature, surface solar direct radiation and solar scattered radiation data of the selected region are input into the net exchange estimation model of the farmland ecological system to generate the daily LAI estimation result of the selected region and selected growth period as the model-simulated LAI temporal result in the growth period of the crops.

In one embodiment, the step S4 includes:
performing date matching on the model-simulated LAI temporal result in the growth period of the crops and the high-resolution image-based multi-temporal LAI result in the growth period to obtain the data of two results of same day;
based on difference of the data of two results of same day, performing sensitivity analysis and parameter uncertainty analysis on the parameters of the net exchange model of the farmland ecological system to obtain the localized model parameters consistent with the characteristics of the crops in the study region, where the localized model parameters include a localized specific leaf area, a distribution coefficient, and a cumulative temperature threshold.

Specifically, date matching is performed on the LAI result obtained by model simulation and the high-resolution image-based multi-temporal LAI result obtained based on empirical relationship in the growth period, and based on the difference of the model-simulated LAI result and the remote-sensing-data-based high-resolution LAI result on same day, sensitivity analysis and parameter uncertainty analysis are performed on the parameters of the net exchange model of the farmland ecological system to obtain the localized model parameters consistent with the characteristics of the crops in the study region.

The sensitivity analysis method is EFAST method and the uncertainty analysis method is GLUE method. The EFAST method is abbreviated from the full name Extend Fourier Amplitude Sensitivity Test and is a variance-based quantitative global sensitivity analysis method proposed by Saltelli et al. The GLUE method is abbreviated from the full name Generalized Likelihood Uncertainty Estimation and is a generalized likelihood uncertainty estimation method proposed by Beven and Binley (1992).

In one embodiment, the step S5 includes the following step:
  the localized model parameters are substituted into the net exchange model of the farmland ecological system; in the daily simulation of the model for LAI, if there is satellite data on the present day, the high-resolution image-based multi-temporal LAI result in the growth period is used for calculation; if there is no satellite data on the present day, the model-simulated LAI temporal result in the growth period of the crops is used for calculation; finally, a spatial distribution temporal result of the net exchange of the farmland ecological system is obtained.

The localized model parameters are substituted into the net exchange model of the farmland ecological system to perform daily data simulation, namely, input daily data into the model for calculation. In this process, the remote-sensing-image-based high-resolution LAI result is put into the model simulation by forced update. At the time of satellite data available, the satellite-data-inverted LAI (the high-resolution-image-based multi-temporal LAI result in the growth period in the step S2) is used; at the time of no satellite data available, the model-simulated LAI (the model-simulated LAI temporal result in the growth period of the crops in the step S3) is used.

For example, if a satellite transits on the first day of January of a year, the remote-sensing-image-based LAI rather than the model-simulated LAI is used in the calculation process. In the daily simulation of LAI, the remote-sensing-image-based high-resolution LAI result is put into the model simulation by forced update. Finally, the spatial distribution temporal result of the net exchange of the farmland ecological system can be obtained.

In order to more clearly describe the specific implementation process and effect of the method provided by the present disclosure, descriptions are made below by way of a specific example.

In this embodiment, an experimental plot where the Daman Super Phenological Station is located is selected to generate the spatial distribution temporal result of the net exchange of the farmland ecological system in the growth period of maize in 2023. The sowing took place around May 1, 2023, with seedling emergence occurring around May 15, and the harvest conducted around Sep. 28, 2023.

As shown in FIG. 1, the present disclosure provides a temporal estimation method of net exchange of a farmland ecological system based on high-resolution remote-sensing data, which includes the following steps:

At step S1, based on camera data of the Daman Super Phenological Station, sowing time and harvest time of the maize in the experimental plot where the Daman Super Phenological Station is located are obtained. All transiting Sentinel-2 Satellite data in this period is obtained, and regional pruning and LAI calculation are performed; all transiting PlanetScope Satellite data in this period is obtained, and regional pruning and NDVI calculation are performed. The list of cloud-free Sentinel-2 and PlanetScope image acquisition dates during the 2023 maize growing season is provided below.

| Sentinel-2 | PlanetScope | | | | |
|---|---|---|---|---|---|
| 20230530 | 20230501 | 20230609 | 20230715 | 20230813 | 20230916 |
| 20230609 | 20230506 | 20230612 | 20230716 | 20230817 | 20230917 |
| 20230614 | 20230507 | 20230613 | 20230717 | 20230821 | 20230918 |
| 20230619 | 20230512 | 20230614 | 20230718 | 20230823 | 20230919 |
| 20230624 | 20230513 | 20230615 | 20230722 | 20230824 | 20230920 |
| 20230629 | 20230514 | 20230616 | 20230723 | 20230825 | 20230921 |
| 20230709 | 20230517 | 20230618 | 20230724 | 20230826 | 20230922 |
| 20230714 | 20230518 | 20230620 | 20230725 | 20230827 | 20230927 |
| 20230724 | 20230519 | 20230621 | 20230728 | 20230830 | 20230929 |
| 20230808 | 20230521 | 20230626 | 20230729 | 20230901 | 20230930 |
| 20230813 | 20230523 | 20230701 | 20230730 | 20230902 | |
| 20230823 | 20230530 | 20230704 | 20230731 | 20230909 | |
| 20230828 | 20230531 | 20230705 | 20230804 | 20230911 | |
| 20230902 | 20230601 | 20230707 | 20230806 | 20230912 | |
| 20230912 | 20230605 | 20230708 | 20230808 | 20230913 | |
| 20230917 | 20230606 | 20230709 | 20230811 | 20230914 | |
| 20230922 | 20230607 | 20230714 | 20230812 | 20230915 | |

Figure 2:
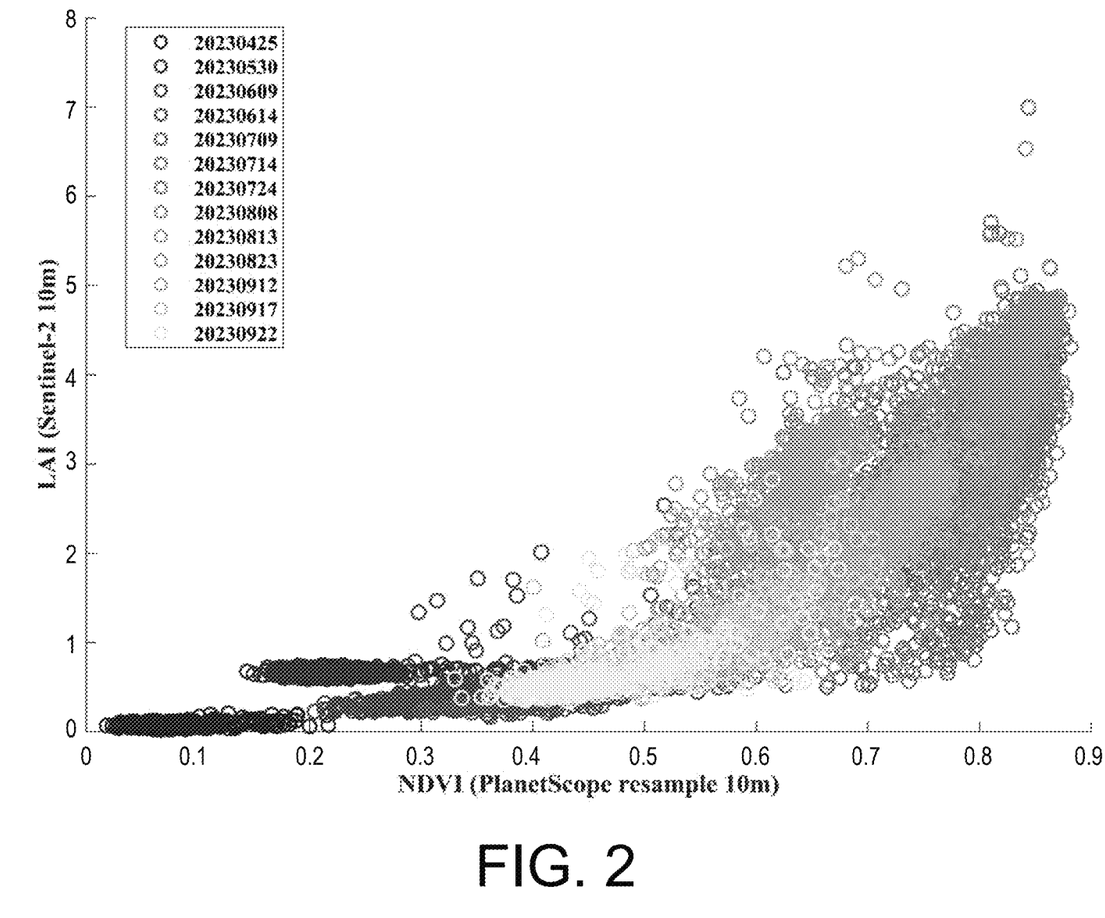
FIG. 2 demonstrates an empirical relationship between image element pairs of LAI and NDVI.

At step S2, the synchronous transiting dates of Sentinel-2 and PlanetScope in the growth period of the maize of the Daman Super Phenological Station are obtained, and screening is performed on the Sentinel-2 LAI results and the PlanetScope NDVI results of these dates. The PlanetScope NDVI results are re-sampled to be consistent with the Sentinel-2 LAI results to generate image element pairs of LAI and NDVI of the region of the Daman Super Phenological Station at all the synchronous transit dates and construct an empirical relationship between them, as shown in FIG. 2. Based on the empirical relationship in FIG. 2, the LAI results of all PlanetScope satellite data in the growth period are generated.

Figure 3:
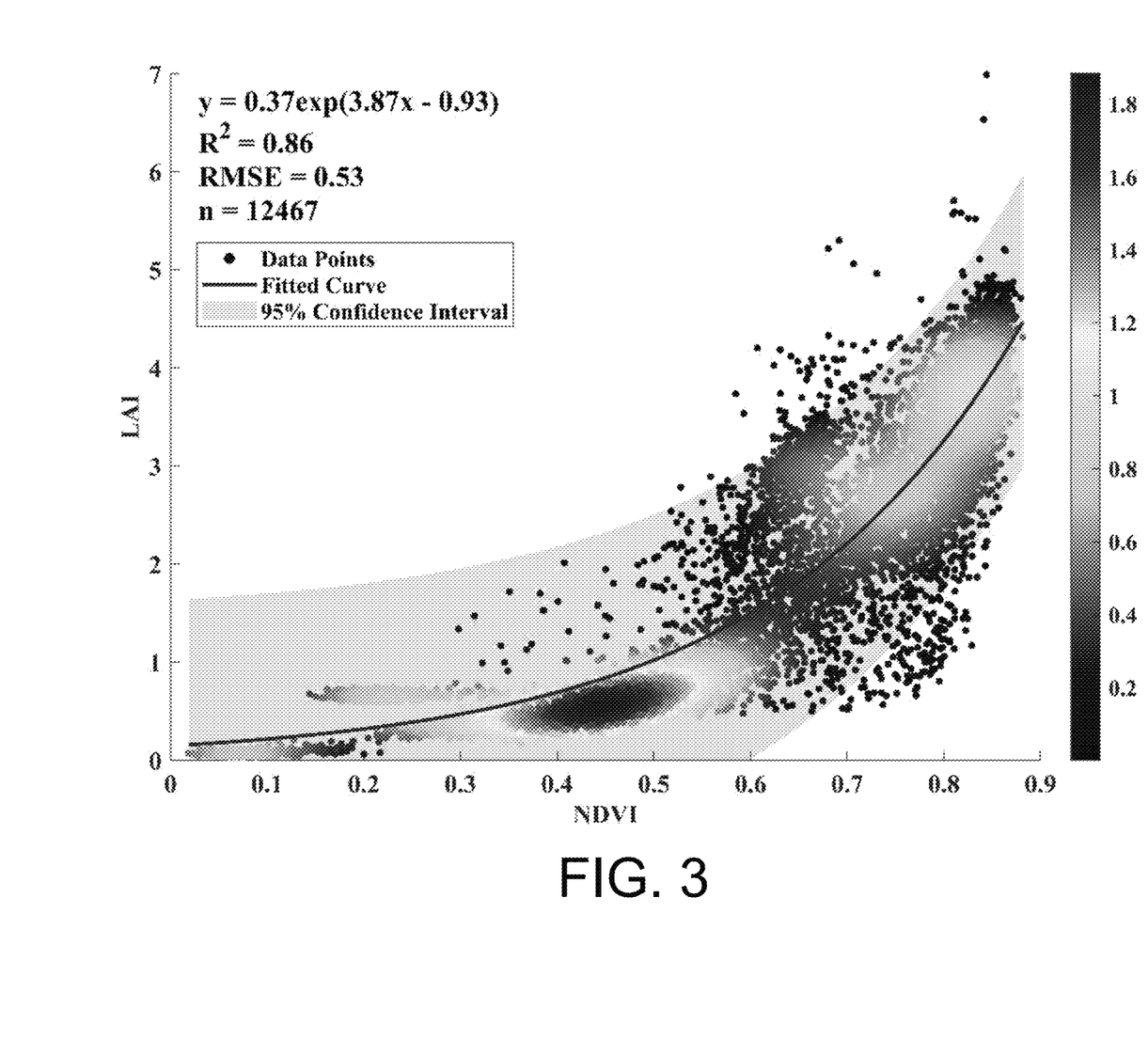
FIG. 3 demonstrates the daily LAI model-simulated results.

At step S3, the daily surface temperature, air temperature, surface solar direct radiation and surface solar scattered radiation measured by the Daman Super Phenological Station in the growth period of the maize of 2023 are input into the net exchange estimation model of the farmland ecological system to generate the daily LAI model-simulated result in the growth period of the maize in the region of the experimental plot of the Daman Super Phenological Station in 2023, as shown in FIG. 3.

At step S4, the LAI daily result obtained in the step S3 is compared with the result of the region of the experimental plot at the date corresponding to the PlanetScope LAI obtained in the step S2, and parameter sensitivity analysis and model uncertainty analysis are performed on the net exchange model of the farmland ecological system to obtain the localized model parameters in the growth period of the maize of the Daman Super Phenological Station.

At step S5, the parameters of the region of the experimental plot of the Daman Super Phenological Station obtained in the step S4 are brought back to the net exchange estimation model of the farmland ecological system, and at the day of sprouting, the LAI result obtained by the PlanetScope satellite is input. In the subsequent daily LAI generation process, the PlanetScope satellite LAI result obtained at step S2 is assimilated into the net exchange estimation model of the farmland ecological system to finally output the daily spatial distribution result of the net exchange of the farmland ecological system in the growth period of the maize in the experimental plot of the Daman Super Phenological Station in 2023, as shown in FIG. 4.

Figure 4:
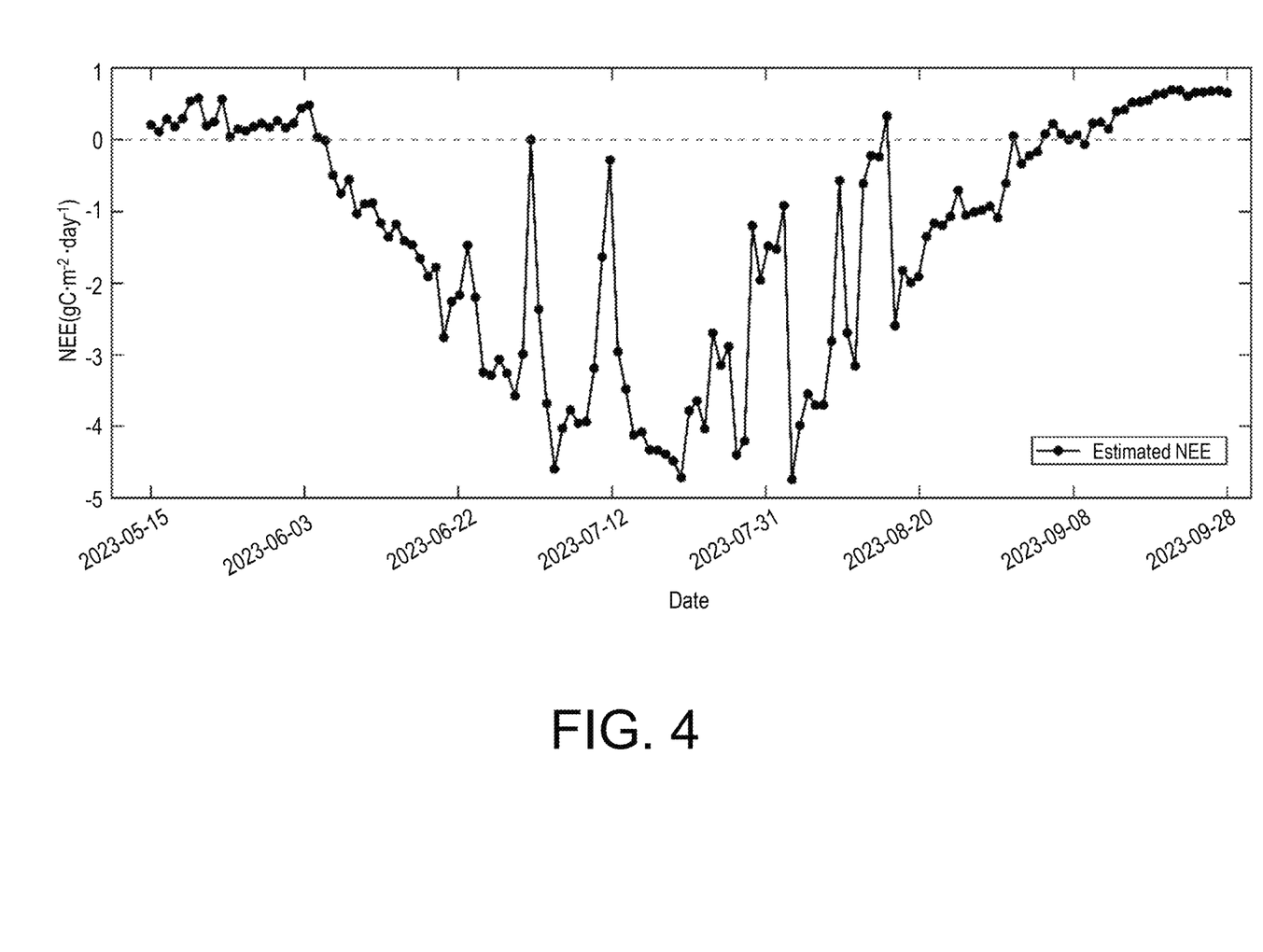
FIG. 4 demonstrates the simulated daily Net Ecosystem Exchange (NEE) results of the farmland ecosystem.

Referring to FIG. 4, the simulated daily Net Ecosystem Exchange (NEE) results of the farmland ecosystem not only provide a quantitative estimate of carbon flux but also serve as a critical basis for multiple real-world applications. These applications include: (1) agricultural carbon accounting, where accurate daily NEE estimates enable the quantification of crop-specific carbon sequestration potential under varying management and climatic conditions; (2) carbon neutrality assessments, allowing policymakers to incorporate farmland contributions into regional or national greenhouse gas inventories; (3) ecological monitoring, supporting the identification of temporal shifts in carbon dynamics linked to crop phenology, drought stress, or soil management practices; and (4) decision support for sustainable land management, where the temporal dynamics of NEE provide actionable information for optimizing practices such as irrigation scheduling, fertilization timing, and harvest planning, ensuring both crop productivity and environmental sustainability. By integrating high-resolution remote sensing and process-based modeling, the derived NEE values transcend simple numerical output and offer actionable insights for sustainable agricultural and environmental planning.

Embodiment 2

Based on the same inventive idea, an embodiment of the present disclosure provides a remote-sensing-based temporal net exchange estimation system of a farmland ecological system, which includes:
- a remote-sensing image obtaining module, configured to obtain a low-resolution Leaf Area Index (LAI) remote-sensing image result and a high-resolution Normalized Difference Vegetation Index (NDVI) remote-sensing image result during the transit of same day in a growth period of a crops;
- a high-resolution LAI result obtaining module, configured to construct an empirical relationship between the high-resolution NDVI remote-sensing image result and the low-resolution LAI remote-sensing image result during the transit of same day in the growth period to obtain a high-resolution image-based multi-temporal LAI result in the growth period;
- a model-simulated result obtaining module, configured to input daily temperature data and daily surface solar radiation data into a pre-constructed net exchange estimation model of the farmland ecological system to obtain a model-simulated LAI temporal result in the growth period of the crops;
- a localized parameter obtaining module, configured to, by using the model-simulated LAI temporal result in the growth period of the crops and the high-resolution image-based multi-temporal LAI result in the growth period, perform parameter sensitivity analysis and model uncertainty analysis on the net exchange estimation model of the farmland ecological system to obtain localized model parameters;
- an outputting module, configured to substitute the localized model parameters into the net exchange model of the farmland ecological system, and in the daily simulation of LAI, assimilate the high-resolution image-based multi-temporal LAI result in the growth period into the model simulation and finally, output the spatial distribution temporal result of the net exchange of the farmland ecological system.

Since the system mentioned in the embodiment 2 of the present disclosure is the system employed for implementing the remote-sensing-based temporal net exchange estimation method of the farmland ecological system in the embodiment 1 of the present disclosure, those skilled in the arts can understand the specific structure and variations of the system based on the method in the embodiment 1 of the present disclosure, and therefore no redundant descriptions are made herein. Those systems employed by the method in the embodiment 1 of the present disclosure all belong to the scope of the present disclosure.

Embodiment 3

Based on the same inventive idea, the present disclosure further provides a computer readable storage medium, storing computer programs thereon, where the programs are executed by the processor to perform the method as mentioned in the embodiment 1.

Since the computer readable storage medium mentioned in the embodiment 3 of the present disclosure is the computer readable storage medium employed in the remote-sensing-based temporal net exchange estimation method of the farmland ecological system in the embodiment 1 of the present disclosure, those skilled in the arts can know about the specific structure and variations of the computer readable storage medium based on the method mentioned in the embodiment 1 of the present disclosure, and therefore, no redundant descriptions are made herein. Those computer readable storage mediums employed by the method in the embodiment 1 of the present disclosure all belong to the scope of the present disclosure.

Embodiment 4

Based on the same inventive idea, the present disclosure provides a computer apparatus, which includes a memory, a processor, and computer programs stored on the memory and run on the processor. The processor executes the above programs to perform the method in the embodiment 1.

Since the computer apparatus mentioned in the embodiment 4 of the present disclosure is the computer apparatus employed in the remote-sensing-based temporal net exchange estimation method of the farmland ecological system in the embodiment 1 of the present disclosure, those skilled in the arts can know about the specific structure and variations of the computer apparatus based on the method mentioned in the embodiment 1 of the present disclosure, and therefore, no redundant descriptions are made herein. Those computer apparatus employed by the method in the embodiment 1 of the present disclosure all belong to the scope of the present disclosure.

Those skilled in the arts should understand that the embodiments of the present disclosure may be provided as methods, systems, or computer program products. Therefore, the present disclosure may take the form of a pure hardware embodiment, a pure software embodiment, or an embodiment combining software and hardware. Furthermore, the embodiments of the present disclosure may take the form of a computer program product implemented on one or more computer available storage mediums (including but not limited to disk memories, CD-ROM, optical storage devices, etc.) containing computer available program codes.

The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams may be implemented by computer program instructions. These computer program instructions may be provided to a processor of a generalpurpose computer, a special-purpose computer, an embedded processing machine, or other programmable data processing devices to produce a machine, so that the instructions executed by the processor of the computers or other programmable data processing devices generate an apparatus for implementing functions specified in one or more flows in the flowchart and/or in one or more blocks in the block diagram.

Although preferred embodiments of the present disclosure are described, those skilled in the arts can, once knowing the basic inventive concept, make other changes and modifications to these embodiments. So, the appended claims are meant to be interpreted as including preferred embodiments and all changes and modifications falling within the scope of the present disclosure. Apparently, those skilled in the arts can make various changes and variations to the embodiments of the present disclosure without departing from the spirit and scope of the embodiments of the present disclosure. Therefore, if these changes and variations to the embodiments of the present disclosure fall within the scope of the claims of the present disclosure and equivalent technologies, the present disclosure is meant to include these changes and variations.

What is claimed is:

1. A remote-sensing-based temporal net exchange estimation method of a farmland ecological system, comprising the following steps:
   at step S1, obtaining a low-resolution Leaf Area Index (LAI) remote-sensing image result and a high-resolution Normalized Difference Vegetation Index (NDVI) remote-sensing image result during transit of a same day in a growth period of crops;
   at step S2, constructing an empirical relationship between the high-resolution NDVI remote-sensing image result and the low-resolution LAI remote-sensing image result during the transit of same day in the growth period to obtain a high-resolution image-based multi-temporal LAI result in the growth period;
   at step S3, inputting daily temperature data and daily surface solar radiation data into a pre-constructed net exchange estimation model of the farmland ecological system to obtain a model-simulated LAI temporal result in the growth period of the crops;
   at step S4, by using the model-simulated LAI temporal result in the growth period of the crops and the high-resolution image-based multi-temporal LAI result in the growth period, performing parameter sensitivity analysis and model uncertainty analysis on the net exchange estimation model of the farmland ecological system to obtain localized model parameters;
   at step S5, substituting the localized model parameters into the net exchange estimation model of the farmland ecological system, and in the daily simulation of LAI, assimilating the high-resolution image-based multi-temporal LAI result in the growth period into model simulation and finally, outputting a spatial distribution temporal result of the net exchange of the farmland ecological system;
   wherein the step S2 comprises:
   performing same-day-transiting image screening on the obtained low-resolution LAI remote-sensing image result and high-resolution NDVI remote-sensing image result to single out two image products transiting same day;
   resampling the high-resolution NDVI remote-sensing image result to the resolution of the low-resolution LAI remote-sensing image result and obtaining all image pairs with dates matching in a to-be-net-exchanged region of the farmland ecological system;
   based on obtained image pairs, constructing an empirical relationship between the high-resolution NDVI remote-sensing image result and the low-resolution LAI remote-sensing image result in the to-be-net-exchanged region of the farmland ecological system to obtain the high-resolution image-based multi-temporal LAI result in the growth period.

2. The remote-sensing-based temporal net exchange estimation method of the farmland ecological system according to claim 1, wherein the step S1 comprises:
   determining a time range of a single crop from sowing to harvest in a study region to determine the growth period of the crops;
   obtaining all transiting Sentinel-2 satellite data within the growth period of the crops to perform regional pruning and LAI calculation and then obtaining the low-resolution LAI remote-sensing image result; obtaining all transiting PlanetScope satellite data within the growth period of the crops to perform regional pruning and NDVI calculation and then obtaining the high-resolution NDVI remote-sensing image result.

3. The remote-sensing-based temporal net exchange estimation method of the farmland ecological system according to claim 1, wherein in the step S3, the pre-constructed net exchange estimation model of the farmland ecological system is obtained based on a difference of net primary productivity and carbon loss caused by heterotrophic respiration and the step S3 comprises:
   inputting the daily temperature and surface solar radiation data in the growth period of the crops into the pre-constructed net exchange estimation model of the farmland ecological system so that the model-simulated LAI temporal result in the growth period of the crops is obtained based on algorithm mechanism of a model for LAI.

4. The remote-sensing-based temporal net exchange estimation method of the farmland ecological system according to claim 1, wherein the step S4 comprises:
   performing date matching on the model-simulated LAI temporal result in the growth period of the crops and the high-resolution image-based multi-temporal LAI result in the growth period to obtain the data of two results of same day;
   based on difference of the data of two results of same day, performing sensitivity analysis and parameter uncertainty analysis on the parameters of the net exchange estimation model of the farmland ecological system to obtain the localized model parameters consistent with the characteristics of the crops in the study region, wherein the localized model parameters comprise a localized specific leaf area, a distribution coefficient, and a cumulative temperature threshold.

5. The remote-sensing-based temporal net exchange estimation method of the farmland ecological system according to claim 1, wherein the step S5 comprises:
   the localized model parameters are substituted into the net exchange estimation model of the farmland ecological system;
   in the daily simulation of a model for LAI, if there is satellite data on the present day, the high-resolution image-based multi-temporal LAI result in the growth period is used for calculation;
   if there is no satellite data on the present day, the model-simulated LAI temporal result in the growth period of the crops is used for calculation;

finally, a spatial distribution temporal result of the net exchange of the farmland ecological system is obtained.

6. A remote-sensing-based temporal net exchange estimation system of a farmland ecological system, comprising:
a processor, configured to load a plurality of instructions in a memory, and when the plurality of instructions are executed, the processor functions as:
a remote-sensing image obtaining module, configured to obtain a low-resolution Leaf Area Index (LAI) remote-sensing image result and a high-resolution Normalized Difference Vegetation Index (NDVI) remote-sensing image result during the transit of same day in a growth period of crops;
a high-resolution LAI result obtaining module, configured to construct an empirical relationship between the high-resolution NDVI remote-sensing image result and the low-resolution LAI remote-sensing image result during the transit of same day in the growth period to obtain a high-resolution image-based multi-temporal LAI result in the growth period;
a model-simulated result obtaining module, configured to input daily temperature data and daily surface solar radiation data into a pre-constructed net exchange estimation model of the farmland ecological system to obtain a model-simulated LAI temporal result in the growth period of the crops;
a localized parameter obtaining module, configured to, by using the model-simulated LAI temporal result in the growth period of the crops and the high-resolution image-based multi-temporal LAI result in the growth period, perform parameter sensitivity analysis and model uncertainty analysis on a net exchange estimation model of the farmland ecological system to obtain localized model parameters;
an outputting module, configured to substitute the localized model parameters into the net exchange estimation model of the farmland ecological system, and in the daily simulation of LAI, assimilate the high-resolution image-based multi-temporal LAI result in the growth period into the model simulation and finally, output a spatial distribution temporal result of the net exchange of the farmland ecological system;
wherein the high-resolution LAI result obtaining module is specifically configured to:
perform same-day-transiting image screening on the obtained low-resolution LAI remote-sensing image result and high-resolution NDVI remote-sensing image result to single out two image products transiting same day;
re-sample the high-resolution NDVI remote-sensing image result to the resolution of the low-resolution LAI remote-sensing image result and obtain all image pairs with dates matching in a to-be-net-exchanged region of the farmland ecological system;
based on the obtained image pairs, construct an empirical relationship between the high-resolution NDVI remote-sensing image result and the low-resolution LAI remote-sensing image result in the to-be-net-exchanged region of the farmland ecological system to obtain the high-resolution image-based multi-temporal LAI result in the growth period.

7. A non-transitory computer readable storage medium, storing computer programs thereon, wherein the computer programs are executed by a processor to perform the method of claim 1.

8. A computer apparatus, comprising a memory, a processor, and computer programs stored on the memory and run the processor, wherein the processor executes the computer programs to perform the method of claim 1.

* * * * *